United States Patent [19]

Baugh et al.

[11] 4,445,213

[45] Apr. 24, 1984

[54] COMMUNICATION LINE INTERFACE FOR CONTROLLING DATA INFORMATION HAVING DIFFERING TRANSMISSION CHARACTERISTICS

[75] Inventors: Charles R. Baugh, Lincroft; Robert M. Smith, Holmdel, both of N.J.

[73] Assignee: Bell Telephone Laboratories, Incorporated, Murray Hill, N.J.

[21] Appl. No.: 341,840

[22] Filed: Jan. 22, 1982

Related U.S. Application Data

[63] Continuation of Ser. No. 62,422, Jul. 31, 1979.

[51] Int. Cl.³ .............................................. H04J 6/02
[52] U.S. Cl. ...................................... 370/94; 370/80; 370/92; 370/60; 370/79
[58] Field of Search ...................... 370/94, 60, 80, 79, 370/86, 102, 108, 19, 92, 89

[56] References Cited

U.S. PATENT DOCUMENTS

| | | | |
|---|---|---|---|
| 3,529,089 | 9/1970 | Davis | 370/89 |
| 3,755,786 | 8/1973 | Dixon | 370/89 |
| 3,790,715 | 2/1974 | Inose | 370/84 |
| 3,921,137 | 11/1975 | McClearn | 370/89 |
| 3,939,307 | 2/1976 | Bishop | 370/112 |
| 3,961,139 | 6/1976 | Bowman | 370/89 |
| 3,997,729 | 12/1976 | Costales | 370/80 |
| 4,082,922 | 4/1978 | Chu | 370/80 |
| 4,093,823 | 6/1978 | Chu | 370/80 |
| 4,095,051 | 6/1978 | Crue | 370/100 |

OTHER PUBLICATIONS

IEEE Transactions on Communications; vol. COM-24, No. 10, pp. 1089–1100, Oct. 1976, "Distributed Processing . . . " by Jenny et al.
Computer Design; vol. 15, No. 6; pp. 83–88; Jun. 1976; "Pacuit Switching . . . " by de Smet et al.
Nachrichten Technik; vol. 20, No. 5 (1970); "Ein Statistisches . . . " by Koenig.
IEEE Int. Conference on Communications; vol. 3, Jul. 13, 1979, "Frame–Mode Customer Access . . . "; pp. 38.5.1–38.5.7, by Accarino et al.

*Primary Examiner*—Douglas W. Olms
*Attorney, Agent, or Firm*—David H. Tannenbaum

[57] ABSTRACT

There is disclosed an office communication system adapted to handle both bursty and continuous data transmission over a single transmission facility to a central switching network. A programmable station controller is used at each station location to interface a number of transmission inputs to the single communication link. The programmable station controller is arranged to statistically multiplex the inputs associated with the bursty data while allowing the continuous data to pass on dedicate time slots. Transmission compatibility between the types of data transmission received from the bursty and continuous data inputs is assured by subdividing the transmission on the single link into frames having four time slots. A fixed number of time slots of each frame are assigned by a central controller to active ones of the continuous data inputs while other time slots of each frame are assigned to the multiplexed bursty data inputs. One of the time slots of each frame is utilized for communicating control information between the programmable station controller and the central switching network controller.

14 Claims, 30 Drawing Figures

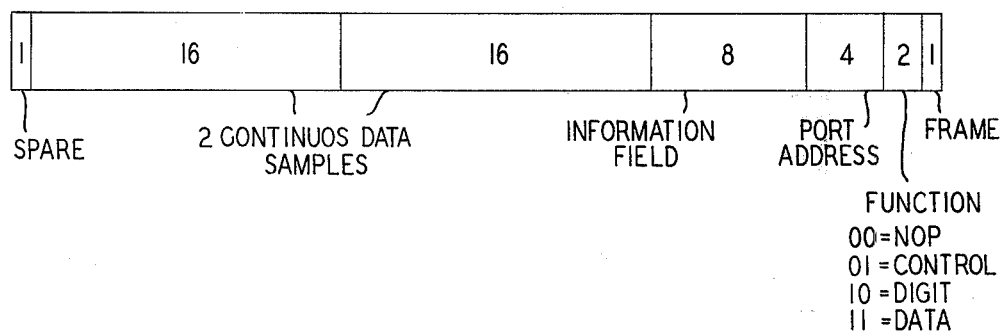

FIG. 2
PSC-PDI PROTOCOL

| 1 | 16 | 16 | 8 | 4 | 2 | 1 |

- SPARE
- 2 CONTINUOS DATA SAMPLES
- INFORMATION FIELD
- PORT ADDRESS
- FRAME

FUNCTION
00 = NOP
01 = CONTROL
10 = DIGIT
11 = DATA

FIG. 3
CONTROL CODES

| HEX CODE | MEANING | |
|---|---|---|
| 00 | ON-HOOK | DATA |
| 01 | OFF-HOOK | |
| 02 | DIAL TONE | |
| 03 | START RINGING | |
| 04 | STOP RINGING | |
| 05 | RING-BACK | |
| 06 | BUSY | |
| 07 | RE-ORDER | |
| 08 | CONNECTION | |
| 09 | INVOKE FLOW CONTROL | |
| 0A | CANCEL FLOW CONTROL | |
| 0B | TRANSMIT "BREAK" | |
| 0C-0F | (SPARES) | |
| 10 | ACK | SYSTEM |
| 11 | NAK | |
| 12 | RESET | |
| 13 | STATUS INQUIRY | |
| 14-1F | (SPARES) | |
| 20 | ON-HOOK | VOICE |
| 21 | OFF-HOOK | |
| 22 | START RINGING | |
| 23 | STOP RINGING | |
| 24 | DISCONNECT | |
| 25-2F | (SPARES) | |
| 1 0 X X X X X X | RS-232 C CONTROL | DATA |

→ REQSD
→ DTRDY
→ SRSND
→ SSDAT

FIG. 12 CODEC AND FILTER CCT 1200

FIG. 17 PSC (PDI) INTERFACE 1600

FIG. 20

| | V1 | V2 | DATA | 11 | | |
|---|---|---|---|---|---|---|
| X | FF83 | 01B8 | 1A | B | 3 | F |

FIG. 21

| | | | EIA | 14 | | |
|---|---|---|---|---|---|---|
| X | FF01 | 00D2 | 88 | E | 1 | F |

FIG. 22

| | | | IDLE | | | |
|---|---|---|---|---|---|---|
| X | F8C3 | FF39 | — | — | 0 | F |

FIG. 23

| | | | DATA | 13-1 | | |
|---|---|---|---|---|---|---|
| X | FFC9 | F86A | 59 | D | 3 | F |

FIG. 24

| | | | DATA | 14 | | |
|---|---|---|---|---|---|---|
| X | FFFF | F012 | CA | E | 3 | F |

FIG. 25

| | | | ON HOOK | 12-1 | | |
|---|---|---|---|---|---|---|
| X | 00F2 | FF63 | 20 | C | 1 | F |

FIG. 26

| | | | DATA | 11 | | |
|---|---|---|---|---|---|---|
| X | 03B4 | — | 6F | B | 3 | F |

FIG. 27

| | | | OFF HOOK | 14 | | |
|---|---|---|---|---|---|---|
| X | 06A9 | — | 21 | E | 1 | F |

FIG. 28

| | V1 | V3 | EIA | 11 | | |
|---|---|---|---|---|---|---|
| X | 01CE | F8A4 | 82 | B | 1 | F |

FIG. 29

| | | | | | | |
|---|---|---|---|---|---|---|
| X | 003F | FF07 | — | — | 0 | F |

*FIG. 30*

| FIG. 1 BLOCK DIAGRAM | FIG. 2 TIMING DIAGRAM |
| --- | --- |
| | FIG. 3 CONTROL CODES |

| FIG. 4-8 BLOCK DIAGRAM OF SIU'S 16A, 16B, 16C, 16D, 16E | FIG. 9 STATION INTERFACE UNIT 16B |
| --- | --- |
| | FIG. 10 STATION INTERFACE UNIT 16B |

| FIG. 11 STATION INTERFACE UNIT 16C | FIG. 12 CODEC AND FILTER CCT 1200 |
| --- | --- |

FIG. 13 PSC BLOCK DIAGRAM

| FIG. 14 PSC SELECTOR 1400 | FIG. 15 PSC SELECTOR 1400 | FIG. 16 PSC(PDI) INTERFACE 1600 | FIG. 18 PSC RAM AND PROM CCTS 1800 |
| --- | --- | --- | --- |
| | | FIG. 17 PSC(PDI) INTERFACE 1600 | FIG. 19 PSC MICROPROCESSOR 1900 |

COMMUNICATION LINE INTERFACE FOR CONTROLLING DATA INFORMATION HAVING DIFFERING TRANSMISSION CHARACTERISTICS

This is a continuation of application Ser. No. 62,422, filed July 31, 1979.

BACKGROUND OF THE INVENTION

This invention is directed to the problem of transmitting varying types of data over a single communication path.

The ability to transfer data from one point to another is fast becoming the backbone of our industrialized society. As data transmission becmes more and more popular the level of sophistication required also rises. Thus we find a situation developing wherein, especially in the business environment, any terminal connected to the switching network must be capable of handling any type of data presented to it in an efficient and universal manner.

While such remains the goal, the problem is compounded in that the data from differing types of equipments arrive at the data terminal in differing forms and at differing rates. For example, data which is representative of speech is usually continuous in nature, For this reason it follows that when voice data is being transmitted it is necessary to establish a continuous or "circuit switched" connected through the network. On the other hand data from a computer terminal or from a sensing device, arrives in spurts and is thus "bursty" in nature. Such bursty data must be immediately forwarded when it appears at the terminal, but due to its bursty or noncontinuous nature many such independent bursty data inputs may be interleaved in a given period of time.

One arrangement for controlling a plurality of data inputs over a common communication channel is to buffer the various data inputs an then statistically multiplex the various buffered inputs so as to communicate over the transmission link those inputs having full buffers. Typically this is accomplished by adding a header to each of the statistical samples transmitted over the link. Such an arrangement is satisfactory when all of the data inputs are bursty in nature since in such a situation natural gaps exist between the various data inputs allowing for a natural multiplex of the inputs. However, when an attempt is made to statistically multiplex communication links having continuous data, one of two problems arises. Either the buffer associated with the continuous data continues to saturate the channel thereby blocking all other buffers or, under some protocols, the continuous data would be ignored for certain periods of time while data from the other buffers is accepted. Both of these problems are intolerable in that to ignore bursty data is tantamount to losing that data. On the other hand, ignoring continuous data results in unacceptable delays and buffer overloading which causes distortion and loss of information.

It is well known to use a statistical multiplexer to solve the problem of communicating information from several bursty data inputs over a single communication link. One example of a statistical multiplexer can be seen in U.S. Pat. No. 4,082,922 (179-15). In C. R. Crue Case 1, U.S. Pat. No. 4,095,051, a demultiplexer is shown using a bit interleaved format. It is also known to utilize concentrators to select active ones of a number of lines under control of a remote controller for the purpose of communicating data over a single data link. In the Inose et al U.S. Pat. No. 3,790,715 there is disclosed a circuit for combining voice data and low speed data on a single line. Inose is an example of subrate multiplexing where the size of each data channel within a frame is adjusted to accommodate the anticipated size of each data word. In Inose, the data channels are permanently assigned, on a per call basis, to the data device. Inose does not take advantage of the bursty nature of some of the data and thus does not statistically multiplex the data.

Thus, while several techniques exist for combining bursty data inputs over a given telephone link, or for combining several continuous data inputs, the problem has remained as to how both such types of information inputs may be economically combined at a standard terminal and transmitted to a switching network over a single link.

SUMMARY OF THE INVENTION

These and other problems are solved by one embodiment of our invention by assigning at each station location a programmable station controller (PSC) interface between the data encoding devices at that location and a programmable data interchanger (PDI) connected onto the digital loop of the switching network. Communication between the station location and the digital loop is over the single channel and is arranged to accommodate the varying types of digital transmission.

By assigning to the programmable station controller some inputs which accept bursty data and some inputs which accept continuous data, it is possible to handle each type of data in an individualized manner. Thus, telephone station sets would be connected to a continuous data input as would be a high-speed continuous printer. On the other hand interactive terminals, such as a time-sharing computer terminal or a fire alarm sensor, would be connected to the bursty inputs.

The bursty data inputs are combined in a statistical multiplexed manner so as to provide a single output multiplexed channel. A protocol is established such that on each channel the programmable station controller communicates with the programmable data interchanger using 8,000 frames per second, each frame having 48 bits divided into 5 time slots each frame has a frame list and a spare bit. The 2 bits in the function time slot of each frame are used to denote the contents of the 8 bits of the information time slot, indicating data from the statistically multiplexed channel or control information between the station controller and the central control unit of the digital loop. The 4 bits of the address time slot denote to which of the 16 possible data sources the present information time slot is dedicated. The fourth time slot has 16 bits of each frame assigned under control of the central controller on a per call basis to one of the continuous data inputs of the programmable service controller. The 16 bits of the fifth time slot are also assigned under control of the central controller to another active one of the continuous data inputs. In this manner each frame communicates data from at most two of the continuous data inputs as well as from the statistical multiplexer thereby assuring that each of the input buffers has sufficient time to empty in each time frame.

BRIEF DESCRIPTION OF THE DRAWING

These and other objects and features together with the operation and utilization of the present invention will be more fully apparent from the illustrative embodiment shown in conjunction with the drawing, in which:

FIG. 2 shows the frame protocol;
FIG. 3 is a chart of the codes used;
FIGS. 9–29 are schematic diagrams;
FIG. 30 shows the relationship of the other FIGS.

GENERAL DESCRIPTION

In a detailed examination of the operation of the invention it will be helpful to review in general terms the overall operation of the system and the protocol for blending both bursty and continuous data on to the same link. This will be performed with respect to FIG. 1 where a number of different types of terminals are interconnected with the programmable station controller via station interface units. For example, a typical telephone station set 10 is connected to programmable station controller (PSC) 17-1 vis station interface unit (SIU) 16A-1. A terminal, such as terminal 11, which may be a data terminal or a video terminal, is interconnected to the same programmable station controller 17-1 via station interface unit 16B-1. It should be noted that from station 10 there can be two types of data from the same station, namely bursty data and continuous data. Station interface unit 16A-1 is arranged to handle each type of data in a separate fashion, therefore, the continuous data from station interface unit 16A-1 is provided over path C1-1 to the C1 input of the continuous port inputs of programmable station controller 17-1. Whereas the bursty data from station interface unit 16A-1 is communicated via cable B1-1 to one of the ports of the bursty inputs (B1–BN) of programmable station controller 17-1.

Figure 7:
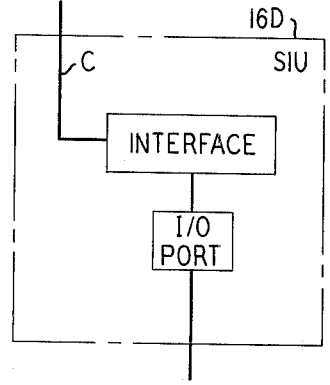

There are several programmable station controllers each at a different location and each arranged with ports into which continuous data inputs can be plugged and with ports into which bursty data inputs can be plugged. These programmable station controllers may be located in separate offices and physically separated from each other. Each programmable station controller is arranged to handle many inputs, some bursty, some continuous, with the data being type interleaved with each other in the particular word format to be shown. It also should be noted that some of the bursty input data can come from one-way communications such as heat sensor 13-1 where information is sent from the heat sensor 13-1 through station interface unit 16D-1 to one of the bursty data inputs of programmable station controller 17-1. A heat sensor in a separate location such as heat sensor 13-2, will communicate to separate programmable station controller 17-2 via station interface unit 16D-2. The station interface units could be all of the same type, however, it may turn out in practice that different types of station interface units would be more economical. For example, station interface unit 16A-1 is arranged to handle both continuous and bursty data in the manner shown in FIG. 4 whereas as shown in FIG. 5 station interface unit 16B-1 is arranged to handle only bursty data over data leads and control leads (cable 90) from terminal 11. Station interface unit 16B-1 may be arranged even in simpler formats such as shown in FIG. 7 to accept data only over a single lead. However, again it must be emphasized that station interface unit 16A-1 could just as easily be used in substitute for station interface unit 16B-1 if such were desired.

It is important to keep in mind that the advantage of the inventive concept is the fact that a standard port is available in several locations to accept differing kinds of data from each location, some occurring at the same time and to interleave that data to a central processing control in a manner so that the system need not be changed each time differing types of terminals are used.

Continuing in FIG. 1, information from each programmable station controller (PSC) is communicated over a two-way communication path in a manner to be detailed more fully hereinafter to a programmable data interchanger (PDI) such as programmable data interchanger 18-1 in a back plane continuous loop system. In such a system, each programmable station controller communicates with an individual one of the programmable data interchangers and under control of the programmable data interchanger in the manner shown in our commonly assigned copending application filed concurrently herewith, Ser. No. 62,423, now U.S. Pat. No. 4,251,880, dated Feb. 17, 1981, the data from the programmable data interchanger is communicated around the loop to the station to which it is directed. The aforementioned patent is hereby incorporated by reference as though it had been fully contained herein. Also incorporated by reference herein is the concurrently filed commonly assigned copending patent application of Baxter-Cummiskey Ser. No. 62,425, now allowed.

Figure 1:
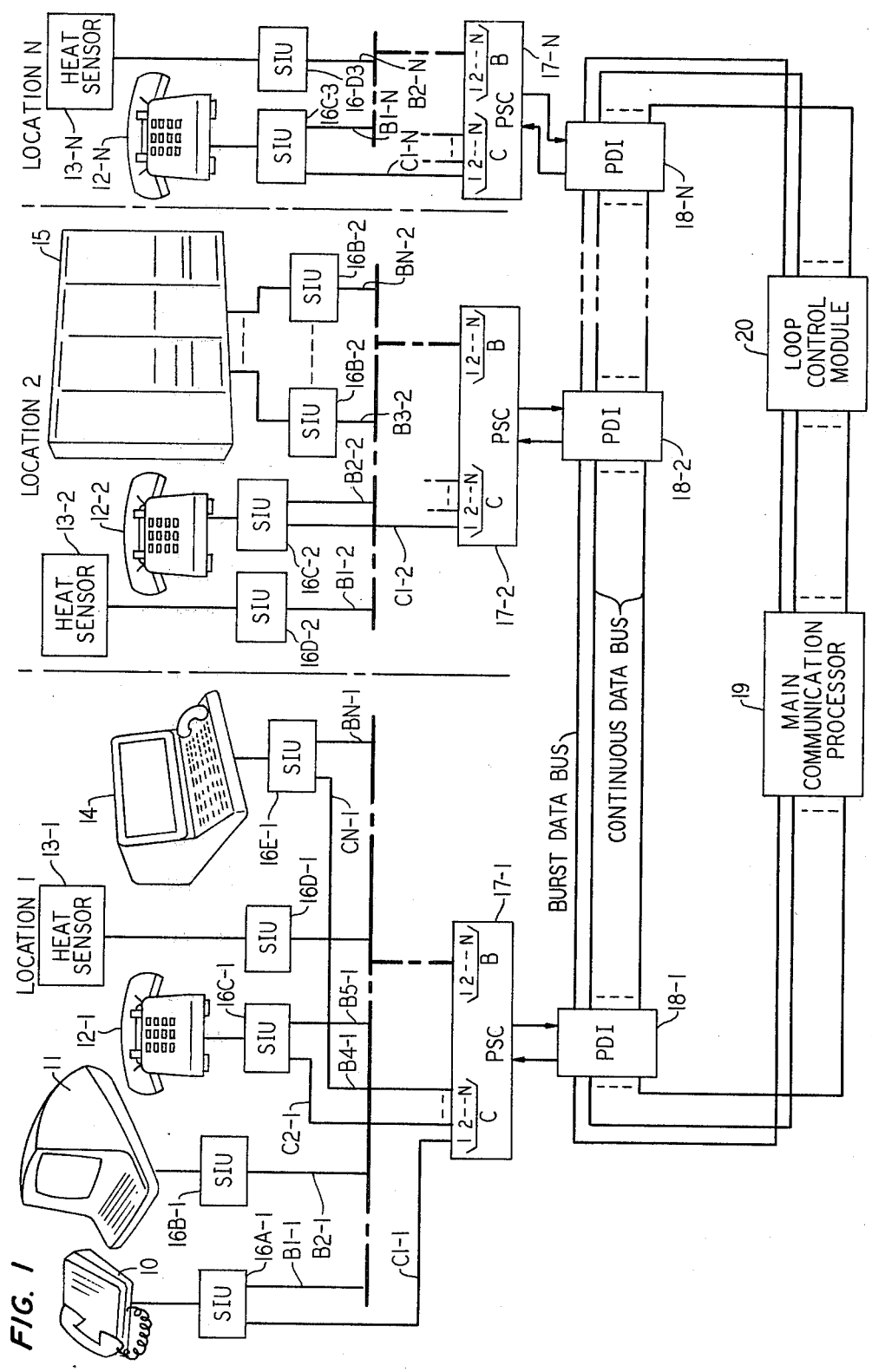
FIG. 1 is a block diagram showing the invention.
Figure 8:
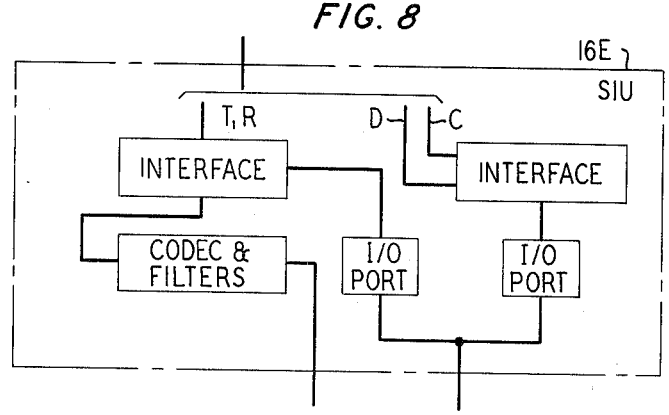

It should be noted with respect to FIG. 1 that there are several types of telephon terminals, such as terminal 10 and terminal 12-1. Terminal 12-1 communicates to station interface unit 16C-1 over a tip and ring pair and FIG. 6 there is shown the control circuit for interface unit 16C-1. Electronic set 10 communicates to station interface unit 16A-1 over a voice and control pair shown in FIG. 4. It should also be noted that some types of terminals may require many inputs, some of which may occur concurrently in any time frame, such as for example, computer 15 shown at location 2, such an arrangement may be connected to programmable station controller 17-2 via one or more station interface units 16B-2. These station interface units are of the type shown in FIG. 5 or FIG. 7. In situations where a single terminal has both types of data, a station interface unit 16E-1 could be utilized such as shown in FIG. 8. The purpose of each programmable station controller, such as programmable station controller 17-1 is to combine the data inputs, both bursty and continuous into a word format for transmission to the associated programmable data interchanger in a manner which takes into account the different characteristics of each data type. Thus, the object is to statistically multiplex the bursty inputs and to provide the proper multiplexing into each frame on the link between the programmable station controller and the programmable data interchanger while also providing a portion of the continuous data with each frame. As discussed, this is accomplished by information being transmitted between the PSC and PDI by a 48-bit frame which repeates a 8 kHz. Each frame is broken into control data, bursty data and digitized continuous data. This is shown in FIG. 2 where the first bit is framing information used to synchronize the frame boundaries. The second two bits are used to indicate which follows. Thus, 00 equals idle or NOP, 01 indicates the control information is to follow, 10 indicates that a dialed digit is to follow, and 11 indicates that bursty data will follow in the information field. The next 4 bits contain the address of the bursty data device sending or receiving the data in the information field.

FIG. 3 shows some of the possible types of control information which could be contained in the 8-bit information field. The column market "HEX CODE" shows the bit pattern for each of the types of control information to be translated in any one frame. Note that one of the hex codes used is the RS232C control code which is used to communicate control information from the terminal's electrical interface to a computer and vice versa for the purpose of managing the data communication protocol between the units. This is done on a dynamic basis when the control information changes.

Returning to FIG. 2, the next 16 bits contain one channel of the continuous data input digitized under control of the station interface unit and the next 16 bits is a second channel of continuous data inputs. Under this scheme two separate continuous data inputs can be communicated over the communication link in each frame, each data sample arriving from a separate continuous data input. These continuous data inputs can be two different telephone stations providing continuous inputs or from one station providing a continuous input and a high-speed computer using a dedicated type of channel where the speed of the data input is greater than that which can be handled in a bursty or statistical multiplex manner.

Station Interface Unit Operation

Keeping in mind that some of the data will arrive at a station interface unit in an analog manner it is important to change such information into a digitized form for use in the continuous data portion of each word frame. Of course, some voice information may arrive in a digitized manner directly from the telephone station set and the station interface unit would then utilize this type of input directly to provide the data input in a continuous manner to the programmable station interface unit.

Figure 4:
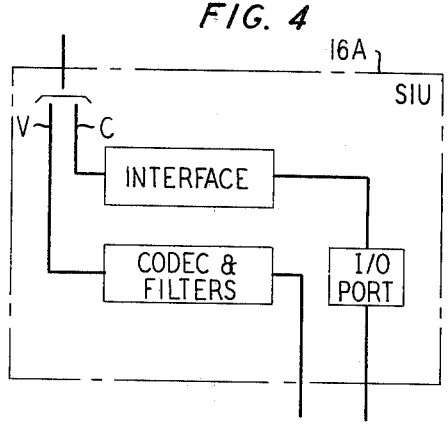
FIGS. 4–8 show block diagrams of typical station interface circuits.
Figure 5:
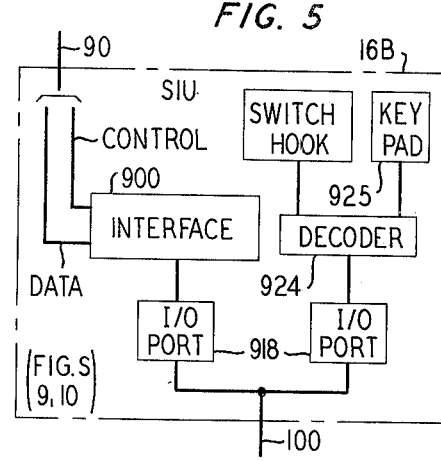

Turning now to FIG. 4, data from the associated terminal would arrive on the C or control lead representative of the control operations which are to occur at the associated station. This information is in the nature of bursty data and provided through an interface to the bursty data input. Voice data from the associated terminal arrives over the voice or V lead and via the codec and filter is converted in straightforward manner to digitized speech information and provided to the continuous data input of the programmable station controller. Reviewing FIG. 4 in conjunction with FIG. 1, it can be seen that the purpose of the station interface is to take control information which arrives from the associated terminal and to put that information on a bus to the programmable station controller. The information is communicated to the controller from the station interface unit over a three-part bus. This bus is shown in detail in FIG. 13 and consists of a data bus, an address bus and a control bus. It is the purpose of the interface circuit in each SIU to translate the data input from the associated terminal onto the three buses and to provide the proper control signals in both directions to the associated programmable station controller. The operation of a typical interface circuit is shown with respect to FIGS. 9 and 10 and operates as follows. The control information from the EIA interface, for example, RS232 is presented to the station interface unit via leads BA, CA, CD, SCA, SBA. These signals go through RS-232C line receivers 901–905 and are presented to the comparator 923 where they are compared with thoe same leads from previous sample times. If there are any differences in the present signals when compared to the last sample of those signals, an interrupt signal denoted by EIACC is generated. The present values of these signals are stored into register 919 for use as references for the next comparison. Those same control leads are presented to the I/O port 918. Under management of the control bus, signals I/OR and A0, A1, A4, data in an 8-bit format on the data bus D0–D7 are presented to the programmable station controller via cable 23. For control leads coming from the programmable station controller the information on the data bus is presented to the I/O port and the information on the address A0, A1, A4 and control bus I/OW effect those signals being read into the I/O port and subsequently on the EIA output leads of the I/O port, noted as outgoing 0-5. Those signals then drive RS232C line drivers 906–913 and subsequently provide the electrical signals to the station apparatus CB, CC, SCB, SCF, SBB, CE, CF, and BB. This completes the description of the operation of the station interface unit for interfacing the control leads of the EIA electrical interface in a common format to the programmable station controller.

Next will be described the operation of the station interface unit for the data portion of the electrical EIA interface. The data coming from the data terminal to the station interface unit arrives at input lead BA goes through interface gate 901 to USART 1004, FIG. 10. The USART is a special function integrated circuit for handling asynchronous start stop data. The USART requires a clock consisting of components 1009, 1007, 1010, and 1018. the USART also requires information to select one of its many modes of operation since it is programmable. Circuit elements 1011–1016 provide selection and programmability of the USART. By means of switches 1016, one selects the parameters to set the USART. These values are loaded into the USART through I/O port 1015 under control of the programmable station controller.

Next the operation of the USART is described. As the data PSDAT is decoded by the USART and presented to the output bus D0–D7 for availability to the programmable station controller, indication of valid data on the bus is given by signal PRIDR on the control bus. The same USART is also used for data flowing in the reverse direction. Namely, data that is being sent to the data terminal in the bursty fashion from the programmable station controller. The programmable station controller selects the USART through use of the address bus signals A0, A2 and presents the data on the data bus. The USART takes the data from the data bus and presents it on data output lead PRDAT of the USART towards the station apparatus through logic gates 1017 and 914. The special break character has timing requirements of 200 milliseconds for its duration. The 200 millisecond one shot denoted by circuit element 1003 is used for that purpose. This completes the description of the station interface units function for the bursty RS232 EIA interface. Associated with the data interface is answer supervision. Switch 915 selects automatic or manual answer. Automatic answer supervision supports unattended station apparatus.

Next the description of the key pad operation and switchhook operation will be described. The key pad is denoted as 925 and its associated encoding circuits as 926–933. Each depression of a particular key is encoded into a unique 4-bit code by gates 929–932. This code is presented to I/O port 918 for subsequent presentation on the data bus to the programmable station controller. Indication of a key depression KEYIN is presented on the control bus by gate 928. The I/O port 918 controls presentation of the actual encoded digit representing the key depressed under supervision of the control and address bus from the programmable station controller through signals A0, A1 and A4 and signals I/OR. The switchhook shown as 1019 and the associated debouncing logic 1001 and 1002 presents the control signal SWHKC on the control bus to programmable station controller to indicate the change of on/off hook condition to the programmable station controller.

Figure 9:
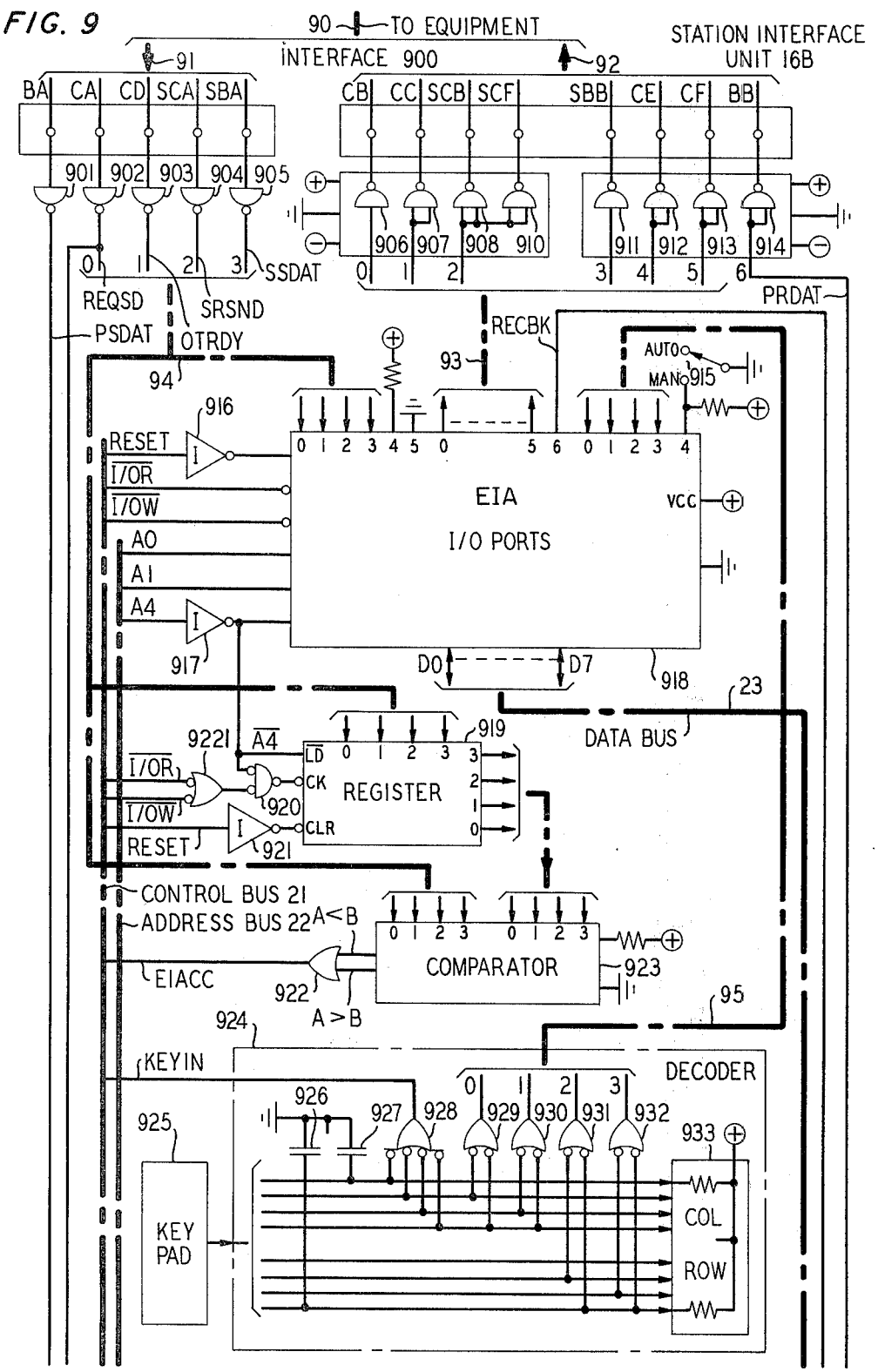
Figure 10:
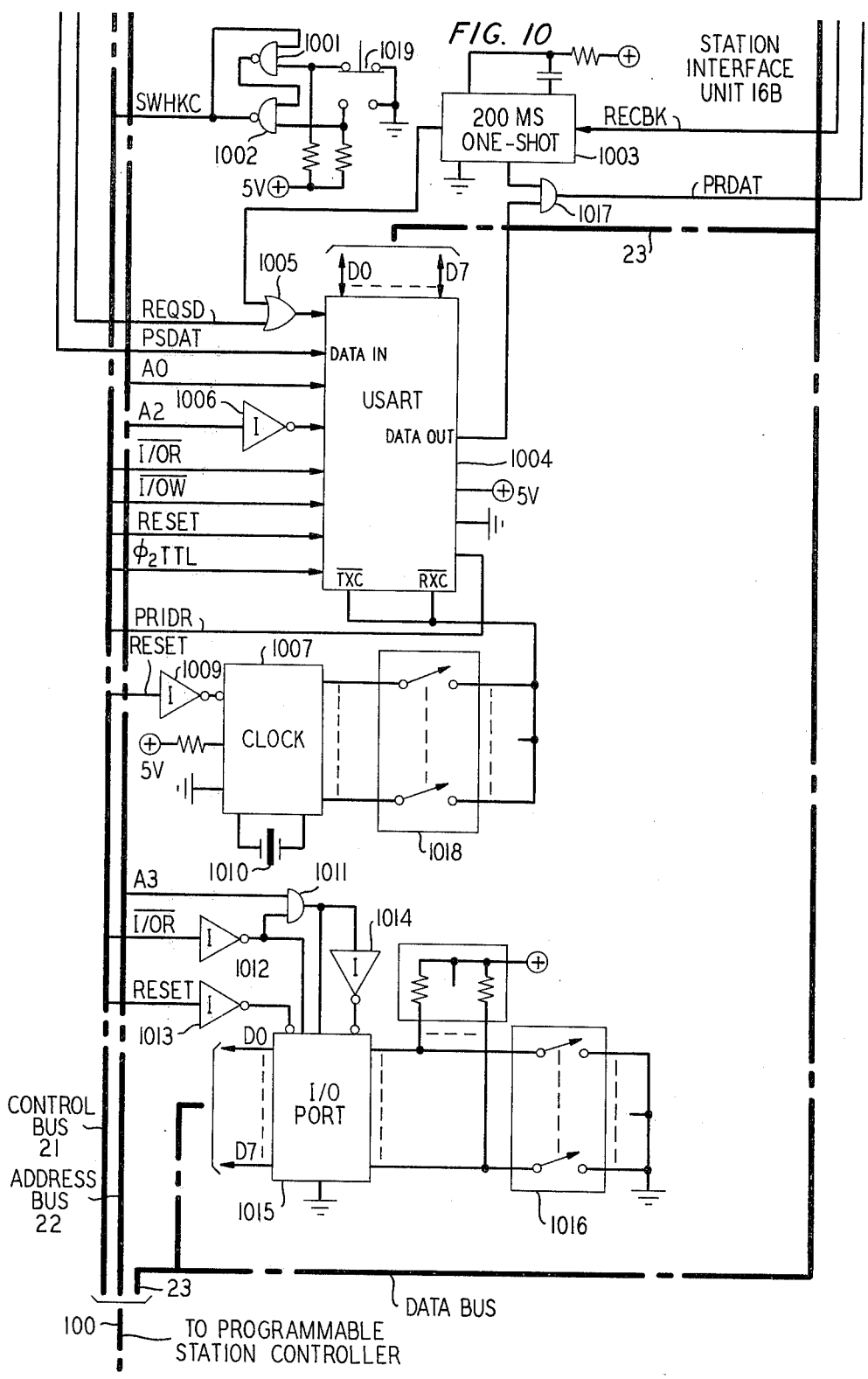

This summarizes all of the elements in FIGS. 9 and 10 that describes the station interface unit depicted in FIG. 5. The elements contain the mechanisms for presenting EIA control information, EIA data, on-hook and off-hook indications and the key pad for dialing information to the programmable station controller on the uniform interface consisting of a control bus, address bus and a data bus.

Station Interface Unit for a Two-Wire Electromechanical Telephone Set

Figure 6:
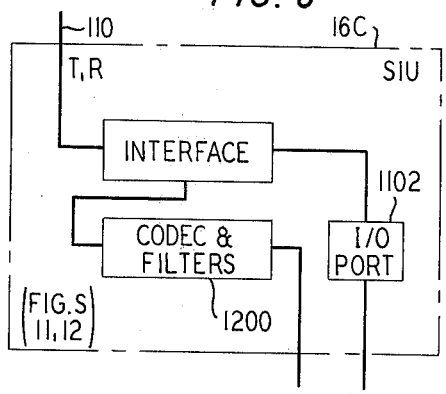
Figure 11:
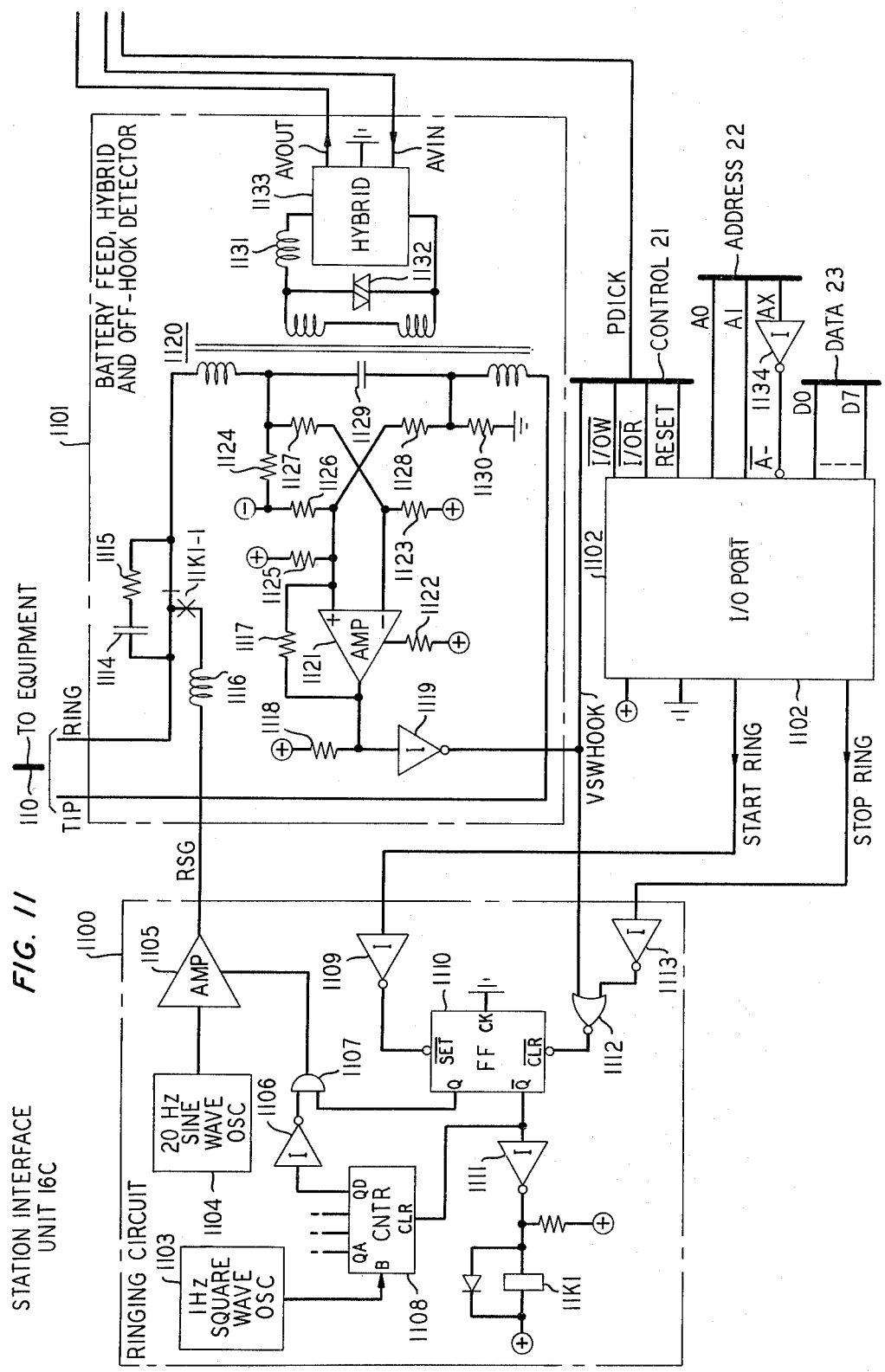
Figure 12:
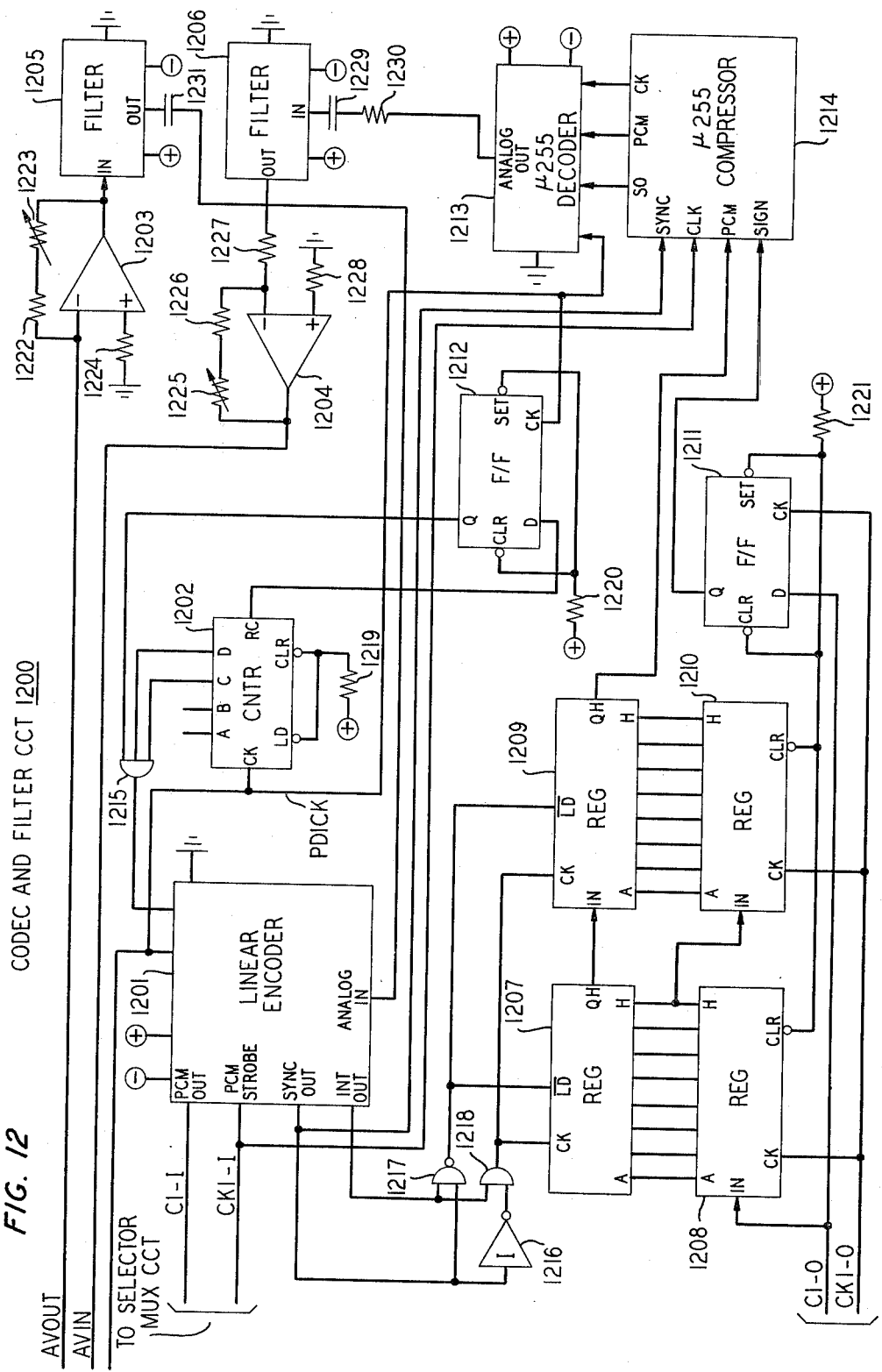

FIGS. 11-12 show the circuitry for the station interface unit for an electromechanical two-wire telephone set as depicted in FIG. 6. FIG. 11 shows the interface to the telephone set, the ringing voltage supply circuit and and I/O port. This station interface unit provides a continuous data channel signal for the voice signal and control data for on/off hook to the programmable station controller. FIG. 12 shows the I/O section to the programmable station controller and a codec plus associated filters for encoding and decoding the analog signal into a digital format.

First the codec section will be described. The analog voice signal comes from the station apparatus via FIG. 11 on the tip and ring through battery feed, hybrid circuit 1101 to the bandlimiting filter 1205, via operational amplifier 1203. This signal is presented to linear encoder unit 1201 as an analog filtered signal. The linear encoder converts the voice signal into a continuous digital data stream with 16-bit samples at an 8 kHz rate. This digital representation of the continuous signal is shifted out of the encoder on lead C1-I by clock pulse CK1-I.

Samples of the continuous data being received from the programmable station controller are shifted into registers 1208 and 1210 by clock pulse CK1-0. The 16-bits are loaded in parallel into registers 1207 and 1209 by the INT OUT and SYNC OUT signals of linear encoder 1201. The bits are subsequently shifted out serially into the μ255 compressor-decoder 1214, 1213. The analog signal feeds reconstruction filter 1206 and amplifier 1204, to drive the AVIN signal to hybrid 1133. The signal is then presented as an analog voice signal through the hybrid on the tip and ring to the electromechanical telephone. This concludes the description of the codec and filters for conversion of analog voice signals into continuous digital data signals and its subsequent interface with the programmable station controller.

Also required for operation of electromechanical sets is the supply of ringing voltage for the telephone. The programmable station controller turns ringing on and off at the telephone by means of signals over the control, address and data bus from I/O port 1102. When the I/O port is selected by the proper address A0, A1, AX the data signals start or stop ringing circuit 1100. Ringing signals are provided via lead RSG to the tip and ring leads through hybrid 1101.

The last control information required for the telephone is an indication of on and off-hook. This information is presented to the control bus as a signal on lead VSWHOOK.

Programmable Station Controller

Figure 13:
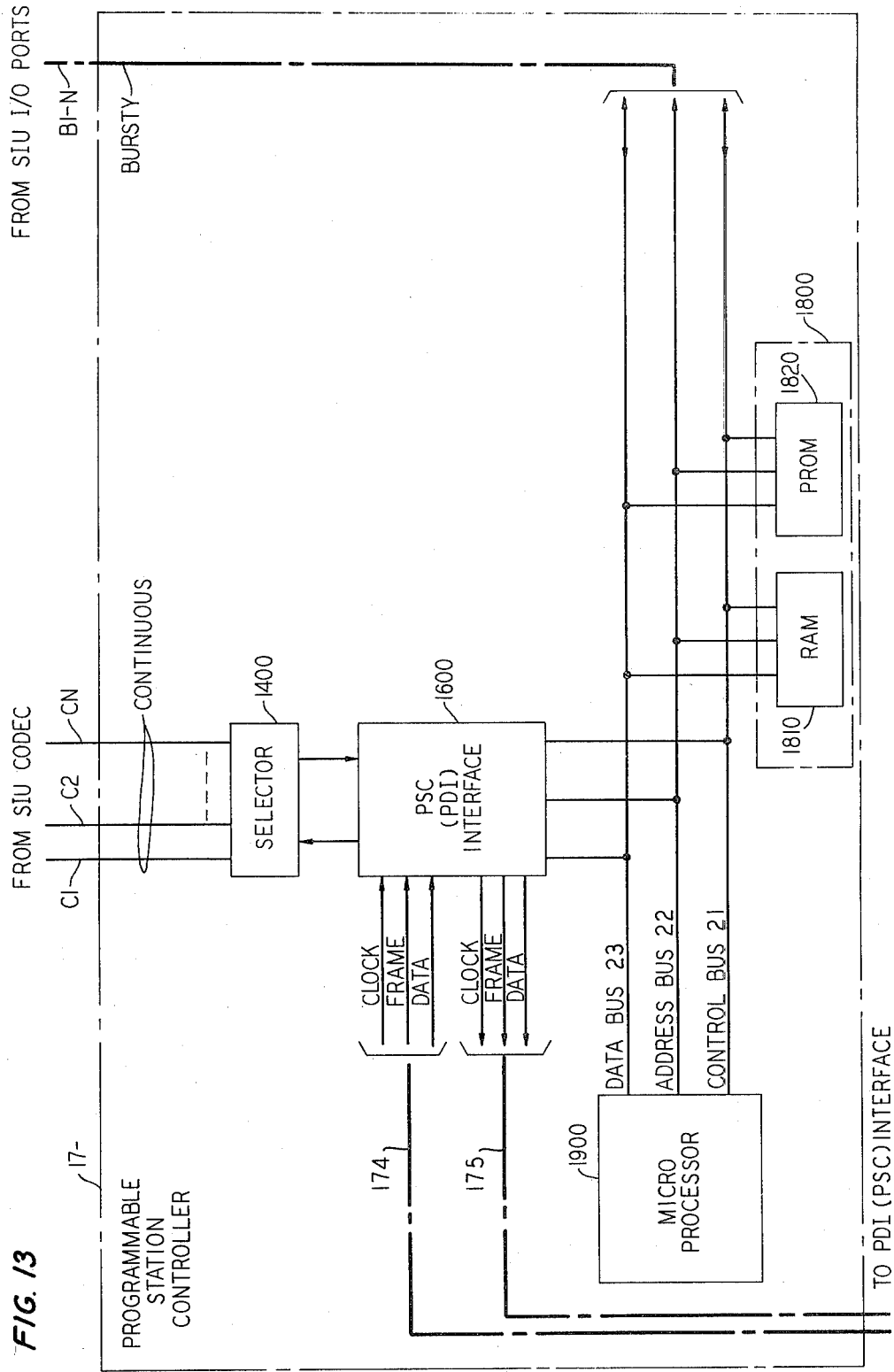
Figure 18:
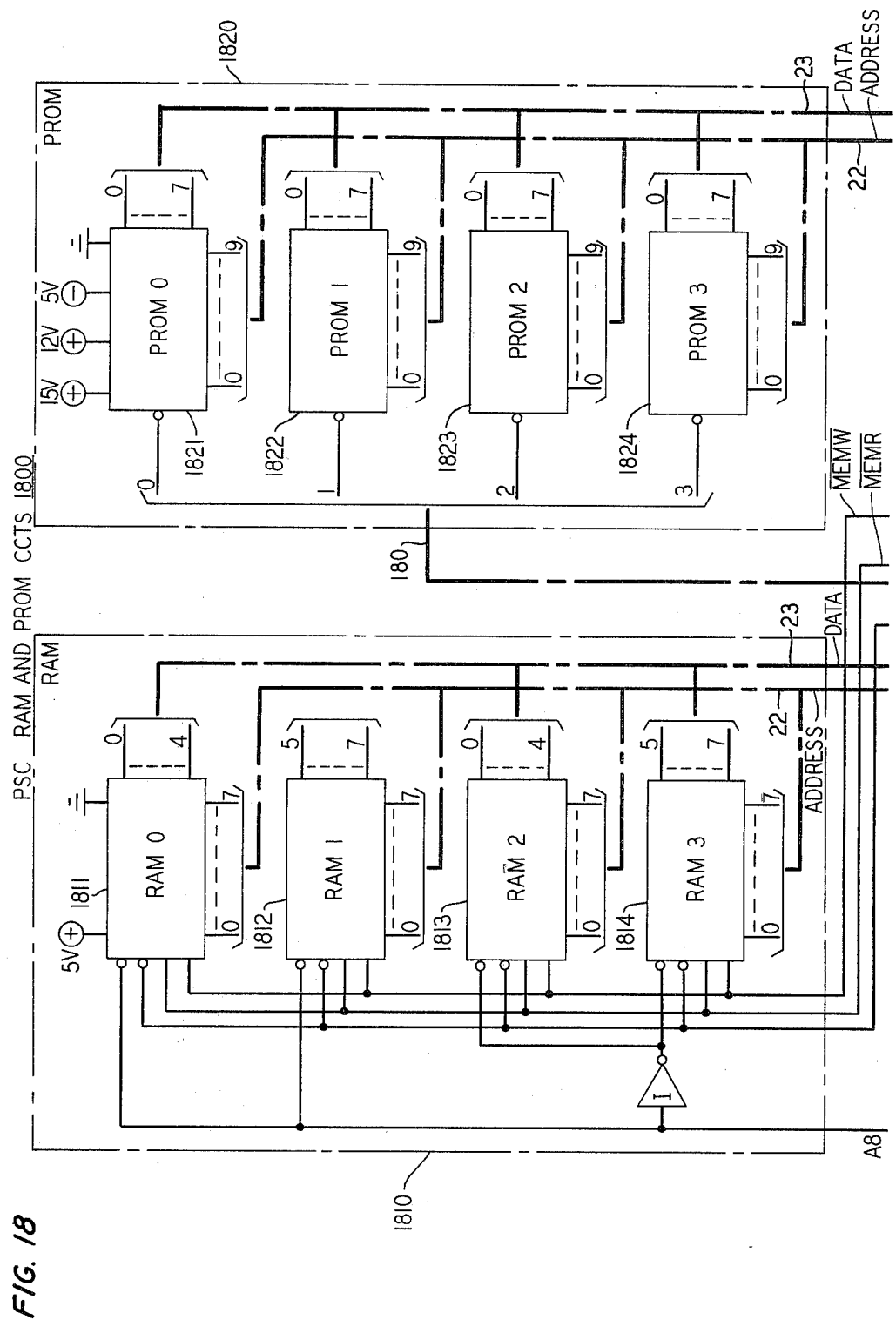
Figure 19:
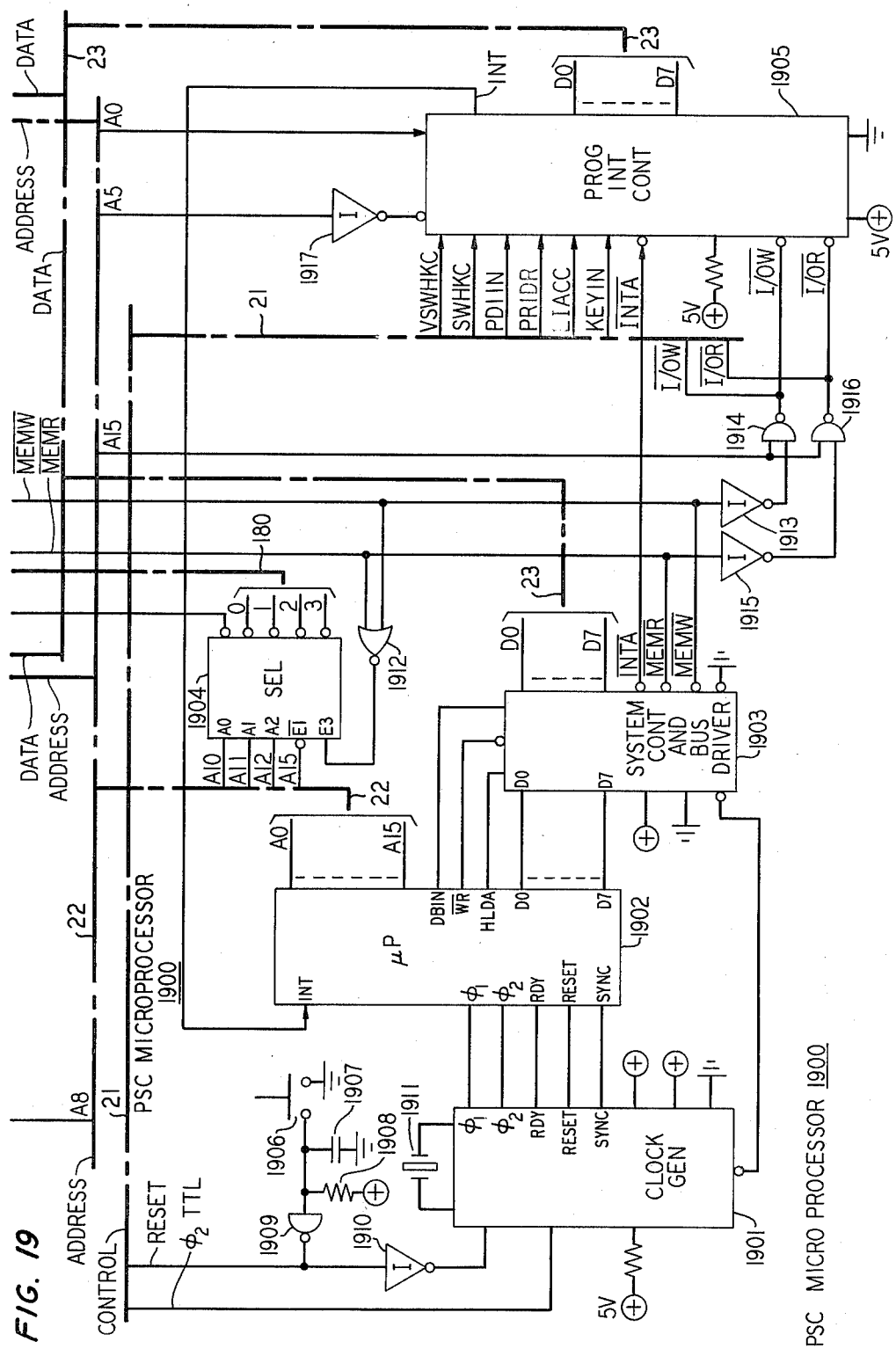

The overall block diagram of the programmable station controller is shown in FIG. 13. FIG. 19 shows the programmable station controller and its control, address, and data buses connecting to the station interface unit. The programmable station controller is a microcomputer stored program unit. The microprocessor 1901-1911, for example, could be Intel 8080, with associated processor RAM 1810 and ROM 1820 (FIG. 18).

Portions of the control bus terminate on the programmable interrupt controller 1905. The arrival of an interrupt activates the INT signal to the processor and places an appropriate insturction on the data bus for use by the station interface unit. FIG. 19 interfaces with the station interface unit shown in FIG. 9. The control leads have the following meaning as terminating on the programmable interrupt controller 1905. The interrupt request input 0 and 1 denote switchhook activity. Interrupt request input 2 denotes arrival of bursty data to the PSC from the PDI. Interrupt request 3 shows an interrupt request to show bursty data transmission requests on input and output for the USART. Interrupt request 4 shows requests for the EIA data control signals. Interrupt request 5 signals key depressed on the key pad. To send bursty data to the station interface unit, the microprocessor establishes the appropriate address on the address bus and sends the appropriate control signals on the control bus to affect the data transfer from the programmable station controller to the appropriate device in station interface unit. This entire interchange between the programmable station controller and the station interface unit follows standard microcomputer system interrupt control logic. This completes the discussion of the interchange of bursty data between the programmable station controller and the station interface unit.

Figure 14:
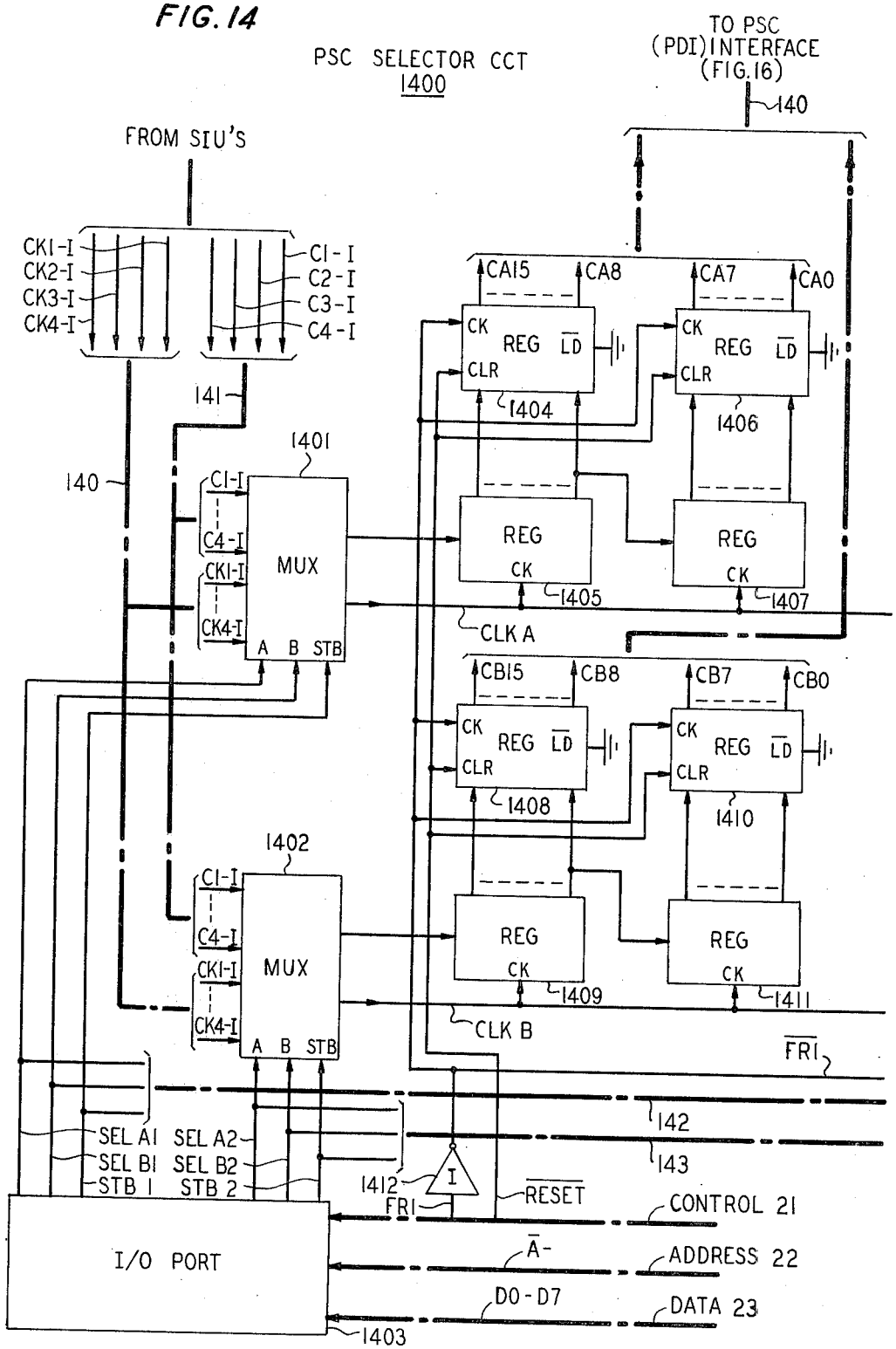

The continuous digital data stream enters the programmable station controller via cable 141 shown on FIG. 14. Four continuous sources from the station interface units are shown as C1-I-C4-I terminating on two multiplexers 1401 and 1402. For example, C1-I could be connected to the output of the linear encoder on FIG. 12. The associated clocks with each of the serial signals are shown as CK1-I through CK4-I and also terminate on the multiplexers. The determination as to which two of the plurality of serial inputs is to be inserted into the two words of the frame for continuous data to the programmable data interchanger is done under the management of the programmable station controller by means of I/O port 1403. The selected signals are placed on the selector lines out from the I/O port, SELA1, SELB1 and STB1 for multiplexer 1401 and SELA2, SELB2 and STB2 for multiplexer 1402. These multiplexers steer one of the plurality of serial inputs to the shift registers 1405 and 1407 for multiplexer 1401, and correspondingly 1409 and 1411 for multiplexer 1402. When a full 16 bits of continuous data resides in those shift registers, they are then parallel strobed into their companion buffer registers consisting of 1404 and 1406 as one buffer register and 1408 and 1410 as the second one. The outputs of these registers are then strobed into the serial stream going towards the PDI and the details of this will be discussed in conjunction with the description of FIG. 16.

Figure 15:
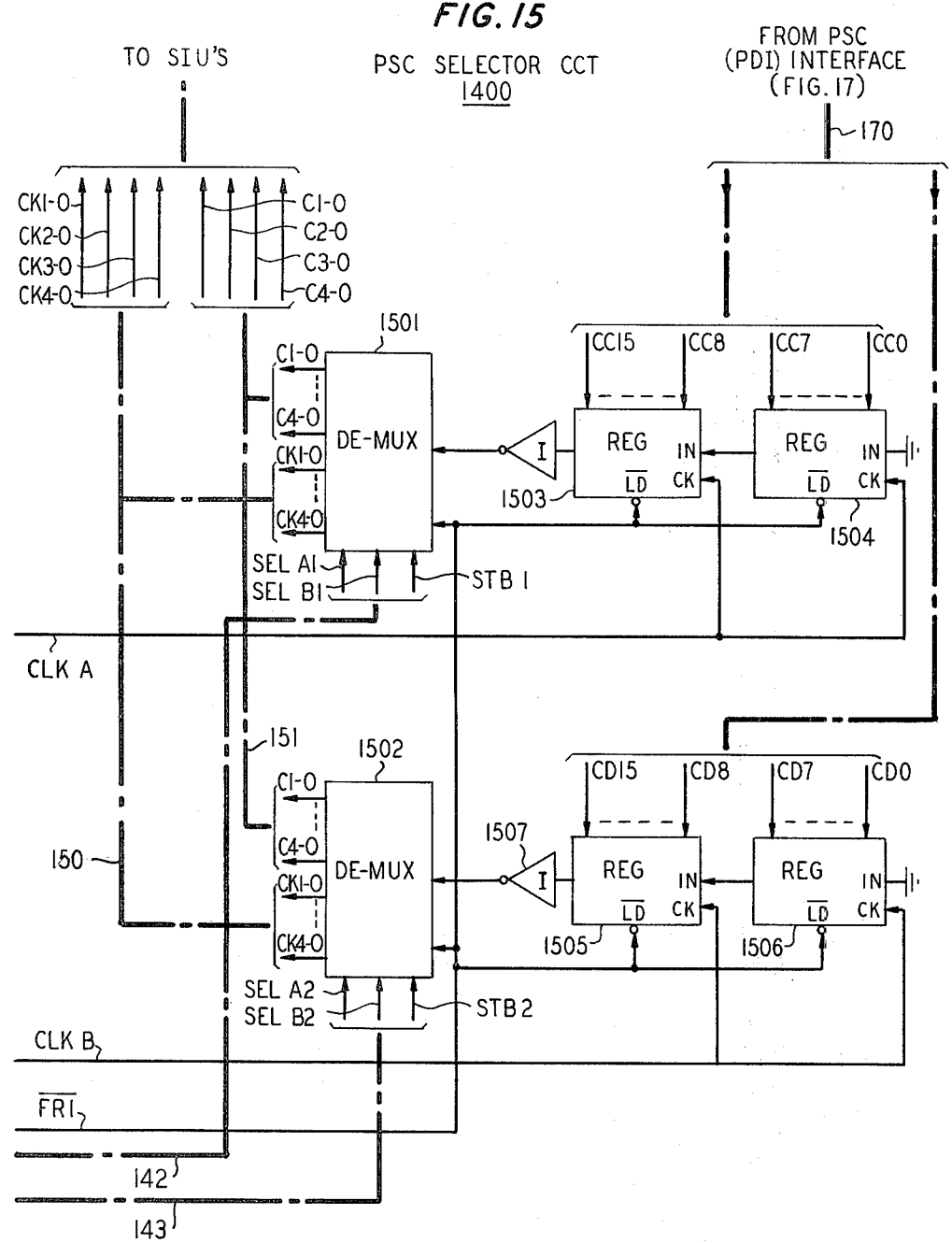

Data coming from the programmable data interchanger is fed into registers 1503 and 1504 in FIG. 15 for one continuous data channel and into 1505 and 1506 for the second continuous data channel. A set of two multiplexers 1501, 1502 then directs that serial continuous stream to their appropriate outgoing channels C1-0 through C4-0 while also sending associated synchronous bit clock to CK1-0-CK4-0. The control of these multiplexers resides in I/O port controller 1403 FIG. 14. This concludes the discussion of the function of PSC selector 1400 which operates to multiplex a plurality of continuous data channels into the two continuous channels of the frame format between the programmable station controller and the programmable data interchanger.

PDI-PSC Interface

Figure 16:
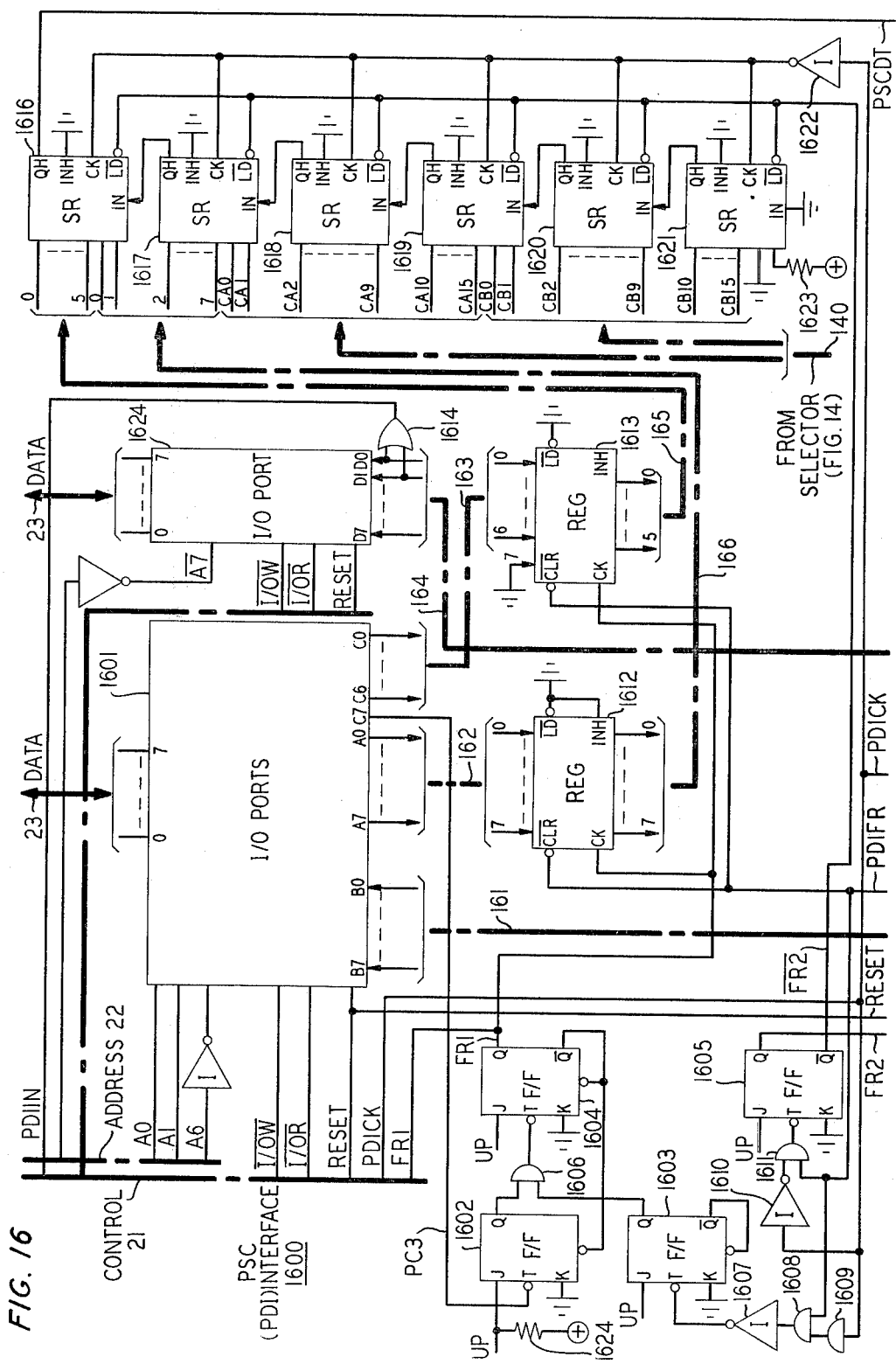
Figure 17:
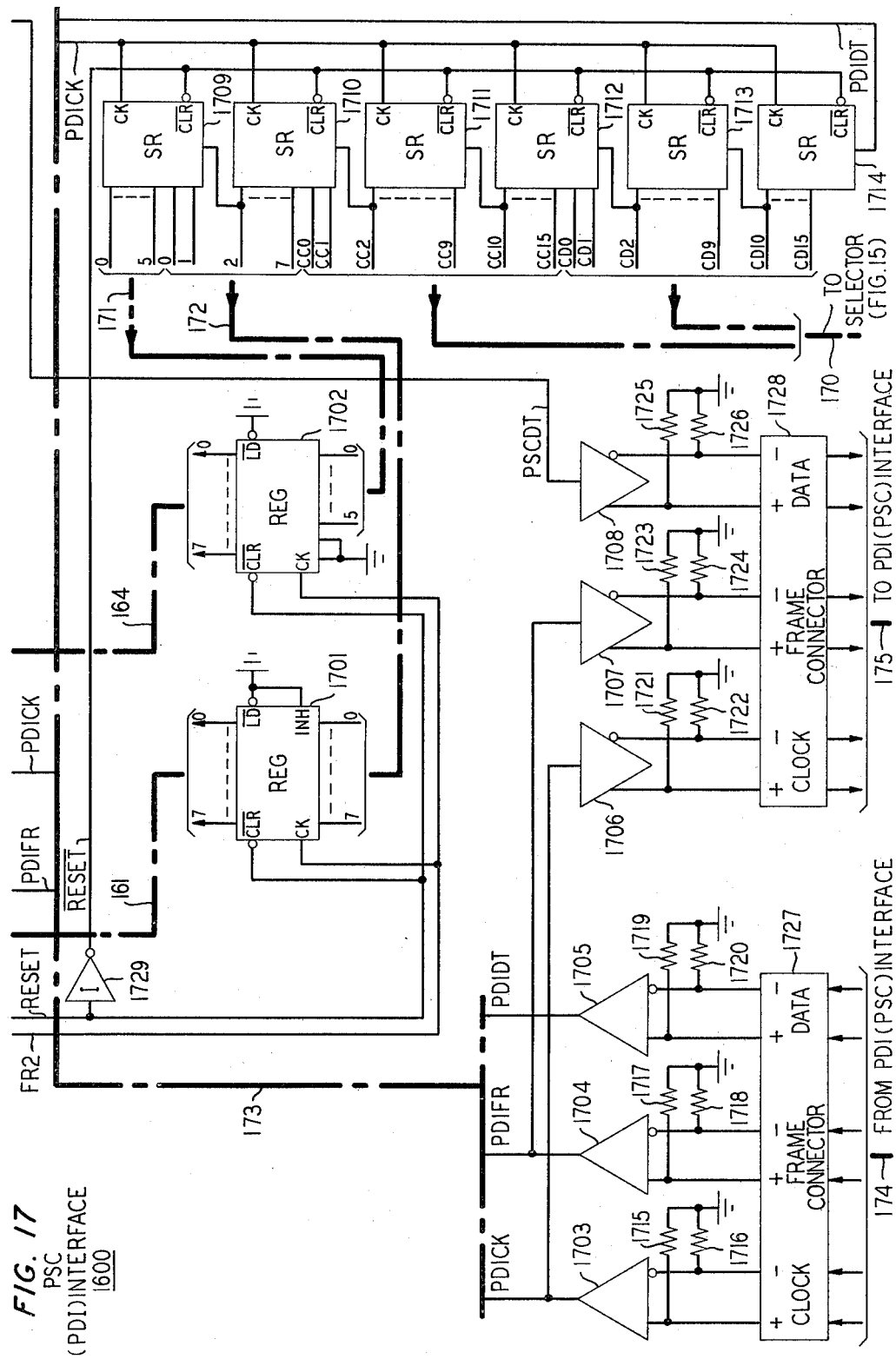

The interface to the communication links between the programmable data interchanger and the programmable station controller is depicted in FIGS. 16 and 17. The control bus 174 consists of three pairs of wires in each direction, one pair for bit clock, one pair for frame connector synchronization clock and one pair for data. The frame format of the data coming in through receiver 1705 has the format shown in FIG. 2 which is a 48-bit frame repeating 8000 times a second. The incoming data is provided from receiver 1705 and serially shifted through shift registers 1714-1709. The incoming frame signal PDIFR from receiver 1704 is used to generate timing for disassembling the various pieces of the frame format from the serial shift register 1709-1714. The signals used to disassemble the incoming frame as well as to assemble the outgoing frame are generated in the circuitry consisting of 1602-1611 and 1624, FIG. 16. For example, the Q output of 1605 is used to strobe data into registers 1701 and 1702, FIG. 17. Register 1701 contains the information field byte of the frame while register 1702 contains the two function bits and the port address of the frame. The two continuous data channels are strobed into buffer registers 1404-1411 on FIG. 14, and into buffer registers 1503, 1504 and 1505, 1506 under control of frame strobing signal FR1 from flip-flop 1604, FIG. 16. These serial data signals are strobed out of registers 1709-1714 in parallel. The foregoing describes the disassembling of the frame coming from the programmable data interchanger.

The programmable station controller also assembles the frame to be sent to the programmable data interchanger in a similar fashion. One each frame, the function field, the port address field, the information field and the two continuous data channel fields are strobbed in parallel into registers 1616-1621, FIG. 16. The two continuous channels are strobbed in from registers 1404, 1406, and 1408, 1410 from the selector shown in FIG. 14. The information field is strobbed from register 1612, FIG. 16 and the function field and port address field from register 1613. All five fields are loaded under control of the FR2 signal generated from flip-flop 1605.

The serial transmission of the data PSCDT to the programmable data interchanger over the communication link proceeds continuously out of shift registers 1616-1621 and out towards programmable data interchangers under control of bit clock signal PDICK. The I/O port 1601 provide the interface for transferring information to and from the information field, function field and port address field of the frame. Once each frame the microprocessor of the programmable station controller may present data through the I/O port 1601 to registers 1612 and 1613 for data in the information, function field, and port address of the outgoing frame. Similarly, once each frame information is taken from registers 1701 and 1702 to be sent to the various modules of the station interface unit and/or to the microcomputer of the programmable station controller. The programmable station controller directs the flow of this information depending upon the type of data in the information field and the function specified in the function field.

Typical Programmable Station Controller to Programmable Data Interchanger Frame Sequence A typical sequence of the contents of several sequential frames between the programmable station controller 17-1 of FIG. 1 and the programmable data interchanger 18-1 of FIG. 1 will be shown. It is assumed that station 10 is presently in conversation with another voice terminal and we will denote the voice signal as V1. Telephone 12-1 is also assumed to be in conversation with another telephone and we will denote that voice signals as V2. Furthermore, we will assume that data terminals 11, 14 and 13-1 are all presently active in transmitting data and being statistically multiplexed into the information field of the frame.

FIGS. 20-29 show the contents of 10 sequential frames that result from a sequence of activity at each of the various terminals previously denoted. FIG. 20 shows the sample value for conversation V2 in one of the continuous data channels. This sample value corresponds to the digitally encoded value of the voltage amplitude associated with a speaker at station 12-1. In the second continuous data channel is an instantaneous sample of the speaker voltage of the telephone conversation V1 of telephone 10 in FIG. 1. In the information field is an 8 bit data byte being sent from data terminal 11 of FIG. 1 and correspondingly the function field contains the hex code 3 signifying the information field consists of data and the address field contains hex "B" denoting terminal 11.

FIG. 21 shows the contents of the subsequent frame. Once again the continuous data field contains instantaneous sample values of conversation V2 and V1, but now the information field contains the EIA control signal information from terminal 14 and the function field contains the hex code 1 to designate that fact and the address field contains the hex code "E" denoting terminal 14.

FIG. 22 again shows the sample values of the two continuous data channels, but the information field now is idle since the function field contains hex 0 indicating that the information field is not used.

FIG. 23 shows the instantaneous sample values of conversations V1 and V2. The information field contains a byte of data from terminal number 13-1 since the address field contains the hex code D and the function field contains the hex code 3.

FIG. 24 shows the sample values of conversations V1 and V2. The information field contains an 8 bit byte from data terminal number 14 as designated by the hex code 3 in the function field and the hex code E in the address field.

FIG. 25 shows sample values from the two conversations, while the information field and address field contain indications that station 12-1 of FIG. 1 has now gone on-hook indicating the termination of conversation V2. The function field correspondingly contains hex 1 to indicate the information field has control information.

In FIG. 26 the contionus data field priorly associated with conversation V2 now has become idle and contains no valid information since conversation V2 has been terminated. However, conversation V1 remains in its assigned continuous data field and its instantaneous sample value is contained therein. The information field contains the data byte from terminal 11 and the function field, therefore, contains the hex code 3 and the address field contains hex code B.

FIG. 27 shows the V1 instantaneous sample value of the continuous data field and the information field show an indication of off-hook from the telephone associated with terminal 14 in FIG. 1. The function field signifies control with the hex code 1 in its field. Therefore in FIG. 28 the instantaneous sample values associated with conversation V3 from terminal 14 is now assigned to the continuous data field that previously held conversation V2. V1 remains in its assigned continuous data field and we show the function field containing hex 1 indicating the information field contains control information. In this case it is EIA information from terminal 11.

FIG. 29, the two sample values associated with conversations V3 and V1 reside in the continuous data fields, the information field is idle indicating that no information is being requested to be sent from the programmable station controller to the programmable data interchanger, and the function field contains the idle condition indicated by 0.

Conclusion

The foregoing detailed description explained the operation of the circuits used to control the flow of information back and forth between the backplane wired programmable data interchanger and the programmable station controller. The programmable station controller is arranged as has been described, to accept both bursty data and continuous data. The bursty data is statistically multiplexed into a single byte of information for use in a given frame. Thus, succeeding frames would contain information from many different sources in the multiplexed manner. The continuous data is assigned to a particular time slot for the duration of the call and even when no communication is present the time slot is reserved.

It, of course, is understood that one skilled in the art could utilize the inventive concepts discussed with a wide variety of circuit arrangements without departing from the spirit and scope of our invention.

What is claimed is:

1. A communications system having controller connected to a digital network over a data link and wherein said controller has a number of input ports arranged to accept digital data for transmission over said data link, each input port arranged to accept data from individual transmission facilities having individual transmission data rates and characterstics, characterized in that said system comprises means for establishing on said data link time frames for digital transmission over said data link, each time frame including at least first and second groups of time slots, each group having a predetermined number of time slots, means for multiplexing digital data received from any input of a first group of said inputs, said data including address header bits as well as information bits, means for interleaving said multiplexed data with input digital data received from at least one input of a second group of inputs, said second group of input data only including bits other than address header bits, and means for arranging said interleaved data in said time frames such that said first group of time slots of each frame are dedicated to said multiplexed data while said second group of time slots of each frame are dedicated to data received from specific input of said second group of inputs.

2. The invention set forth in claim 1 further characterized in that said multiplexed data is data characterized as bursty data, and wherein said data from said second input group is data characterized as continuous data.

3. In a communication system having both bursty and continuous data inputs for accepting digital data from stations connectable to said inputs, said system arranged for communicating said data between said stations through a switching network, the combination characterized in that said system comprises a station controller for interfacing between a group of said stations and said switching network over a single communication link between each said station controller and said network, means for establishing on said link a plurality of repetitive time frames, each said time frame having a multiplexed data time slot and a fixed number n continuous data time slots, all said time slots adapted for the movement of data bits between said station controller and said network, means for multiplexing digital data received from all said bursty data inputs, means for placing multiplexed data into said multiplexed data time slot of each time frame, said multiplexed data having addressing information bits assigned thereto, means for assigning a first active one of said continuous data inputs to a first idle one of said continuous data time slots of each time frame, and means for placing digital information received from said first active continuous data input into said assigned continuous data time slot, said digital information not having addressing information bits assigned thereto.

4. The invention set forth in claim 3 further characterized in that there further comprises means for assigning as second active one of said continuous data inputs to a second one of said continous data time slots of each time frame, and means for placing digital information received from said second active continuous data input into said second assigned continuous data time slot of each frame, said digital information also not having addressing information bits assigned thereto.

5. The invention set forth in claim 4 further characterized in that said fixed number n equals 2 and wherein there comprises means for inhibiting the assigning of information from a third active one of said continuous data inputs while said first and second continuous data inputs remain assigned to said continuous data time slots.

6. A digital communication system arranged to transmit data bits among a plurality of stations connected to said system, said system comprising a digital loop, a plurality of controllers connected to said digital loop over a single bidirectional link, each controller arranged to accept communication transmission from a plurality of stations, said transmission having both bursty and continuous characteristics, means for establishing on said link a plurality of repetitive time frames, each said time frame having a single bursty data time slot and a fixed number of continuous data time slots, said time slots adapted to the movement of data bits between said station controller and said digital loop, means for multiplexing digital data received from all said bursty data inputs, said multiplexed data having address information associated therewith, means for placing bytes of multiplexed data into said bursty data time slot of each time frame, means for assigning a first active one of said continuous data inputs to a first one of said continuous data time slots of each time frame, whether or not information is actually being received from said input, and means for placing received bytes of digital information received from said first active continuous data input into said assigned time slot, said received bytes having no address information associated therewith.

7. The method of concurrently transmitting both bursty data from a group of inputs and continuous data from another group of inputs over a single channel characterized in that said method includes the steps of:

establishing time frames for transmitting said data over said channel, multiplexing data received from said bursty data inputs, generating from said multiplexed data a series of bursty bytes, each series of said bursty data bytes including address headers, generating from each active continuous data input a series of continuous data bytes, each series of said continuous data bytes not including address headers, interleaving said bursty data bytes with said generated continuous data bytes from active ones of said continuous data inputs, and placing said interleaved bytes in said time frames such that a fixed time slot of each said frame is dedicated to said bursty data bytes while a fixed number of other time slots of each frame are dedicated to said continuous data bytes from said active ones of said continuous data inputs, whether or not data is actually being received from said active continuous data inputs.

8. An arrangement for concurrently transmitting both bursty data from a group of inputs and continuous data from another group of inputs over a communication channel having time frames established thereon characterized in that said arrangement includes:

means for generating from said bursty data inputs a series of bytes, each series of said bursty data bytes including address header bits, means for generating from each active continuous data input a series of continuous data bytes, each series of said continuous data byte only including bits other than address header bits, and means for arranging said bursty data bytes and said continuous data bytes for presentation to said time frames such that a fixed time slot of each said frame is dedicated to said bursty data bytes while a fixed number of other time slots of each said frame are dedicated to said continuous data inputs, whether or not data is actually being received from said active continuous data inputs.

9. An arrangement for concurrently transmitting data bits from a first group of inputs and data bits from a second group of inputs over a communication channel having time frames established thereon characterized in that said arrangement includes:

means for establishing from said first group of inputs a series of data bit bytes, said series including at least one data bit used by said transmission arrangement for destination identity.

means for establishing from each active input of said second group of inputs a series of data bit bytes, each series of said data bit bytes not containing bits used by said transmission arrangement for destination identity, and means for arranging said first group data bytes and said second group data bytes for presentation to said time frames such that a fixed field of each said frame is dedicated to said first group of data bytes while a fixed number of other fields of each said frame are dedicated to said second group of inputs, whether or not data is actually being received from said active second group data inputs.

10. The invention set forth in claim 9 wherein data in a particular one of said other fields of each frame is delivered to a destination in accordance with the position of said particular field within said frame, while data in said fixed field of said frame is delivered to a destination in accordance with information provided via said fixed field.

11. A method for concurrently transmitting data bits from a group of inputs and data bits from a second group of inputs over a communication channel having time frames established thereon characterized in that said method includes:

establishing from said first group of inputs a series of data bit tyes, said first series including at least one destination identity bit, establishing from each active second group of inputs a series of data bit bytes, each series of said data bit bytes not containing bits used by said transmission arrangement for destination identity, and arranging said first group data bytes and said second group data bytes for presentation to said time frames such that a fixed field of each said frame is dedicated to said first group of data bytes while a fixed number of other fields of each said frame are dedicated to said second group of inputs, whether or not data is actually being received from said active second group data inputs.

12. A method of communicating data on a communication channel, said method comprising establishing repetitive time sequence channel frames, each frame having data fields adapted for transporting data bits along said communication channel, p1 formatting received data such that data from certain active sources is transported within pre-identified ones of said data fields for delivery to a destination dependent upon the position of the data field within said frame, and such that said data from other sources is transported within a particular data field for delivery to a destination dependent upon information communicated via said communication channel.

13. A circuit for formatting received data for presentation to a communication channel, said channel having established thereon frames, each said frame including data fields, said circuit comprising means for providing data received from first and second inputs to respective pre-identified first and second data fields within a frame for delivery via said communication channel to first and second destinations in accordance with the position of said data fields within said frame, and means for providing data received from a third input to a third data field within a frame for delivery via said communication channel to a destination in accordance with information represented by the data presented to said communiction channel on said third data field.

14. The invention set forth in claim 13 wherein said last named presented data represents address information derived from the processing of said third input data.

* * * * *

UNITED STATES PATENT AND TRADEMARK OFFICE
CERTIFICATE OF CORRECTION

PATENT NO. : 4,445,213

DATED : April 24, 1984

INVENTOR(S) : Charles R. Baugh and Robert M. Smith

It is certified that error appears in the above-identified patent and that said Letters Patent is hereby corrected as shown below:

Column 1, line 15, "becmes" should read --becomes--. Column 1, line 26, "," should be a --.--. Column 1, line 39, "an" should read --and--. Column 2, line 45, "list" should read --bit--. Column 3, line 21, "vis" should read --via--. Column 4, line 60, "repeates" should read --repeats--. Column 4, line 65, after "which" it should read --function is being performed by the information field which--. Column 5, line 68, "thoe" should read --those--. Column 6, line 32, "the" should read --The--. Column 11, line 54, after "having" insert --a--. Column 12, line 51, "as" should read --a--. Column 13, line 11, "to" should read --for--. Column 14, line 59, "sequence" should read --sequenced--. Column 14, line 62, delete "pl".

Signed and Sealed this

Nineteenth Day of November 1985

[SEAL]

Attest:

DONALD J. QUIGG

Attesting Officer

Commissioner of Patents and Trademarks